(12) United States Patent
Karasaki et al.

(10) Patent No.: US 6,633,422 B2
(45) Date of Patent: Oct. 14, 2003

(54) OPTICAL MIRROR AND OPTICAL SCANNER AND LASER MACHINING APPARATUS USING THE SAME

(75) Inventors: Hidehiko Karasaki, Hyogo (JP); Kimiko Kawazoe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/231,204

(22) Filed: Aug. 30, 2002

(65) Prior Publication Data

US 2002/0196512 A1 Dec. 26, 2002

Related U.S. Application Data

(62) Division of application No. 09/691,250, filed on Oct. 19, 2000, now Pat. No. 6,556,331.

(30) Foreign Application Priority Data

Oct. 21, 1999 (JP) ............................................. 11-299633

(51) Int. Cl.⁷ ......................... G02B 26/08; G02B 7/182
(52) U.S. Cl. ...................... 359/200; 359/198; 359/212; 359/871; 359/223; 359/226
(58) Field of Search ................................ 359/198–200, 359/212–214, 221, 223, 226, 838, 848, 871, 872; 248/466, 475.1

(56) References Cited

U.S. PATENT DOCUMENTS

| 4,655,543 A | 4/1987 | Montagu |
| 4,790,639 A | 12/1988 | Baumgarten et al. |
| 4,820,911 A | 4/1989 | Arackellian et al. |
| 6,239,928 B1 * | 5/2001 | Whitehead et al. ......... 359/871 |

FOREIGN PATENT DOCUMENTS

| EP | 0 459 010 A2 | 12/1991 |
| JP | 3-164702 | 7/1991 |
| NL | 25 27 731 A1 | 12/1976 |

* cited by examiner

Primary Examiner—James Phan
(74) Attorney, Agent, or Firm—Wenderoth, Lind & Ponack, L.L.P.

(57) ABSTRACT

A reliable galvano-mirror employed for laser machining is disclosed. The mirror is far reduced its weight for getting a higher rotation. On the rear surface of the mirror, a light-weight rib-structure, which is formed from a mirror support beam centered across the surface and some ribs extending from the beam, holds the mirror. Against a distortion occurred in rotating at high speed, the mirror is provided with a high rigidity. And the mirror is structured integrally with the motor shaft holder. Besides, a slit is formed between the rib disposed close to the holder and the support beam centered across the rear surface of the mirror. Providing slit enables to minimize a local distortion caused by a stress from fastening screws to attach the mirror to the motor shaft.

4 Claims, 12 Drawing Sheets

OPTICAL MIRROR AND OPTICAL SCANNER AND LASER MACHINING APPARATUS USING THE SAME

This is a divisional application of Ser. No. 09/691,250 filed Oct. 19, 2000, U.S. Pat. No. 6,556,331.

FIELD OF THE INVENTION

The present invention relates to a rapidly rotatable optical mirror, and an optical scanner and a laser machining apparatus employing the improved mirror.

BACKGROUND OF THE INVENTION

The prior art optical mirror will be described hereinafter with reference to the accompanying drawings.

FIGS. 12A and 12B show the structure of conventional lightweight optical mirror 120.

Optical mirror 120, as shown in FIG. 12A, comprises reflecting surface 121 and holder 128 which a motor shaft (not shown) is attached thereto. Holder 128 further comprises semi-circular cross section groove 122 for the motor shaft, and screw holes 123.

FIG. 12B shows the structure of the mirror seen from the rear surface. As shown in FIG. 2B, reflecting surface 121 has on its rear surface:

(1) mirror support beam 124 extending from holder 128;
(2) plural strengthening ribs 125 extending from the both sides of beam 124 toward the rim of the rear surface of reflecting surface 121; and
(3) peripheral ribs 126 that are disposed close to holder 128 and extended along the rim of the rear surface of reflecting surface 121.

The optical mirror structured above operates in a manner, which will be described hereinafter. Optical mirror 120 (FIGS. 12A, 12B) is attached directly to the rotary shaft of the motor (not shown), and used for a galvanometer scanner in which the rotation angle of the motor defines a reflecting direction of light.

Laser beam and illumination light are reflected by mirror surface 121. The shape and area of the reflected light depend on the shape of incident light and the rotation angle of the optical mirror.

To attach optical mirror 120 to the motor shaft, the motor shaft is fitted in semi-circular groove 122 and held with a retaining ring (not shown) having also a semi-circular groove, then secured by screws at screw holes 123. Diameters both of groove 122 and the groove of the retaining ring are generally sized to be a few micrometers bigger than that of the motor shaft. However, the perimeter of the motor shaft measures bigger than the perimeter of roughly semi-cylindrical shape formed from facing each semi-circular portion of groove 122 and the retaining ring's groove. Therefore, fastening the screws to secure the optical mirror to the motor shaft inconveniently applies a stress to screw holes 123 vertically with respect to the reflecting surface 121.

Optical mirror 120 is required to keep enough rigidity against a distortion occurred between reflecting surface 121 and holder 128 while the motor is rotating. For keeping enough rigidity, mirror support beam 124, plural ribs 125, and peripheral ribs 126 close to holder 128 are formed on the rear surface of reflecting surface 121. In addition, as shown in FIGS. 12A and 12B, reflecting surface 121 of optical mirror 120 and holder 128 are formed in one piece.

Mirror support beam 124 functions as an absorber of the vibrations created in the axial direction of the motor shaft while the motor is rotating. Further, ribs 125 and 126 make a large contribution to minimize the fluttering of the mirror when rotating.

With the structure described above, however, a distortion occurs locally in the mirror surface when fastening the screws. When an optical scanner with such optical mirror is used for controlling the traveling path of laser beam in laser machining, flaws have often been detected outside the machined main hole in a workpiece.

FIG. 13 shows a distortion in the mirror surface when the motor shaft is attached and secured by screws to the conventional optical mirror, indicating distorted area by the curves.

It is apparent from FIG. 13 that the distortion which occurs at the screw holes disposed on the both sides of groove 122 is, through the peripheral ribs disposed on the rim of the mirror surface, carried to the mirror surface near the holder.

According to an amount of distortion measured by an interferometer, in the optical mirror made of a material containing beryllium for weight reduction, the Peak-Valley (P-V) value of the precision of the mirror surface measures no less than 4 $\mu$m. This amount of distortion is compatible to the optical path difference of approximately one-half of the wavelength (approx. 10 $\mu$m) of a carbon dioxide laser having relatively long wavelength. Generally, 1/20th of the wavelength of laser is defined to be optically aberration-free value (that is, approx. 0.5 $\mu$m for a carbon dioxide laser.) The P-V value in FIG. 13, however, shows as much as about 10 times the aberration-free value for the carbon dioxide laser.

Referring to FIG. 14, now will be described a two-dimensional optical scanner using the conventional optical mirror.

The conventional two-dimensional scanner, as shown in FIG. 14, comprises two sets of galvano-mirrors 140A, 140B and position control unit 148. In FIG. 14, galvano-mirror 140A further comprises motor 143A having motor shaft 142A, and optical mirror 141A attached to motor shaft 142A. Motor 143A contains a position sensor (not shown) for position control. An output signal from the position sensor is fed into position control unit 148 for adjusting the position of the optical mirror. The explanation for galvano-mirror 140B will be omitted because the mirror has the same structure as mirror 140A described above. Hereinafter, depending on the parts constituting mirror 140A or 140B, either letter "A" or "B" is appended to the corresponding parts number.

Optical mirror 141A of galvano-mirror 140A, as shown in FIG. 14, horizontally rotates about motor shaft 142A, while mirror 141B of galvano-mirror 140B vertically rotates about motor shaft 142B.

The optical scanner structured above operates in a manner, which will be described hereinafter. Optical mirror 141A reflects laser beam 145 shown in FIG. 14 to direct an intended position on optical mirror 141B. In response to the reflection, the position sensor, which is built in motor 143A of galvano-mirror 140A, detects the orientation of mirror 141A. Getting the signal back from the position sensor, position control unit 148 adjusts the reflecting direction.

Similarly, in response to the light incident on mirror 140B, the position sensor, which is built in motor 143B, detects the orientation of mirror 141B. Getting the signal back from the position sensor, position control unit 148 adjusts the reflecting direction.

However, with the two-dimensional scanner employing mirrors 141A and 141B that have the conventional structure, the aimed surface cannot be radiated with the laser beam reflected from mirrors 141A and 141B due to a bad distortion.

FIG. 15 shows an optical system of the laser machining apparatus equipped with the optical scanner illustrated in FIG. 14. In FIG. 15, the conventional laser machining apparatus comprises:
- a) laser oscillator 151 that produces a laser beam;
- b) collimator 152 collimating the output laser beam from laser oscillator 151;
- c) mask changer 153 masking the collimated laser beam;
- d) reflecting mirror 154 reflecting the laser beam passed through mask changer 153;
- e) two-dimensional optical scanner 155 scanning the incident laser beam through reflecting mirror 154;
- f) scanning lens 156 projecting the incident laser beam through optical scanner 155; and
- g) two-dimensional machining table 158 for mounting workpiece 157 to be machined with the projected laser beam. (Workpiece 157 is an object to be machined on machining table 158.)

The laser machining apparatus structured above operates in a manner, which will be described hereinafter. Laser oscillator 151 produces laser beam. After changed the beam diameter by Collimator 152, the laser beam is irradiated over the mask placed on mask changer 153. A portion of the laser beam, which passes through the mask, is launched into optical scanner 155 for controlling the scanning direction. Then scanning lens 156 projects the shape of the mask on workpiece 157 sitting on the two-dimensional machining table. Workpiece 157 is machined according to the projected mask shape.

FIG. 16 shows the strength distribution of laser spots, comparing with each other the strength at some spots in the entire scan area. If there is any distortion in the optical mirror, the strength distribution of laser spots varies depending on the position of the scan area. FIG. 16 shows the state of the distribution schematically. The strength distribution of laser spots is obtained by the position-by-position calculation of the scan area, using the machining optical system shown in FIG. 15 and, the data measured by an interferometer, which indicates the distortion of the mirror. FIG. 16 shows the calculated strength distribution of laser spots, comparing the strength with each other at nine spots in the scan area.

At central spot 161 of the scan area, as shown in FIG. 16, main beam 161A for machining maintains its diameter's shape being circular (i.e., symmetric.) However, for example, at peripheral spot 162 of the scan area, main beam 162A for machining has no longer the symmetry in its shape. Furthermore, some beams with asymmetric beam diameter, for example, 162B, 162C, and 162D, are observed outside the main beam 162A. Each asymmetric beam has appreciable beam strength. The fact has an adversely affect in machining a workpiece made of resin with a relatively low work threshold. That is, at central spot 161 where main beam 161A maintains its beam diameter being asymmetric, the machined hole on a workpiece maintains its shape being circular (i.e., symmetric.) However, for example, at peripheral spot 162, the machined hole on the workpiece undergoes a distortion due to an asymmetric shape of beam diameter. Besides, some asymmetric beams existed outside the main beam make unwanted holes near the machined main hole in a workpiece. Such workpiece has been treated as a serious nonconforming piece due to the flaws near the machined main hole.

BRIEF SUMMARY OF THE INVENTION

The present invention addresses the problems above. This provides an optical mirror with a structure minimizing a distortion that occurs in the mirror surface due to the stress from fastening screws when the optical mirror is attached to the motor shaft. It is an object that a laser machining apparatus with the mirror offers a consistent machining quality throughout the scan area.

The optical mirror of the present invention comprises a reflecting surface having optical characteristics, a holder to attach the mirror to other member, and a plurality of ribs disposed on the rear of the reflecting surface. The mirror also has slits in the ribs peripherally disposed close to the holder.

In the optical mirror that is attached to the motor shaft and rotates, the mirror comprises:
- (1) a reflecting surface having optical characteristics;
- (2) a holder to attach the mirror to motor shaft;
- (3) a mirror support beam centered across the rear surface; and
- (4) ribs extending from the support beam toward the rim of the rear surface.

The mirror is also structured so that the motor shaft-to-be-attached surface, or attachment surface, of the holder is held almost vertically with respect to the reflecting surface, or in other words, such that the attachment surface is substantially perpendicular with respect to the reflection surface.

DETAILED DESCRIPTION OF THE INVENTION

With reference to the accompanying drawings, now will be described the optical mirror of the present invention, the optical scanner employing the mirror, the laser machining apparatus employing the scanner.

First Preferred Embodiment

Figure 1:
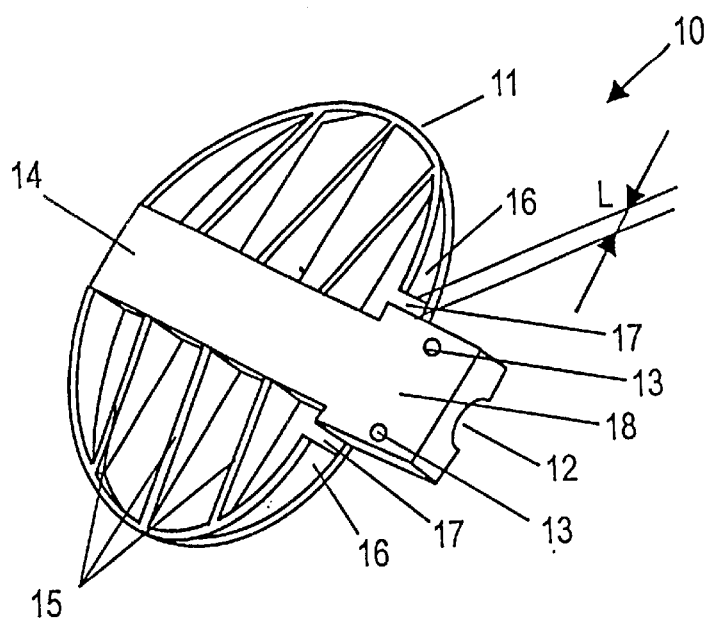
FIG. 1 shows a perspective view seen from the rear surface of the optical mirror in accordance with a first preferred embodiment.
Figure 12A:
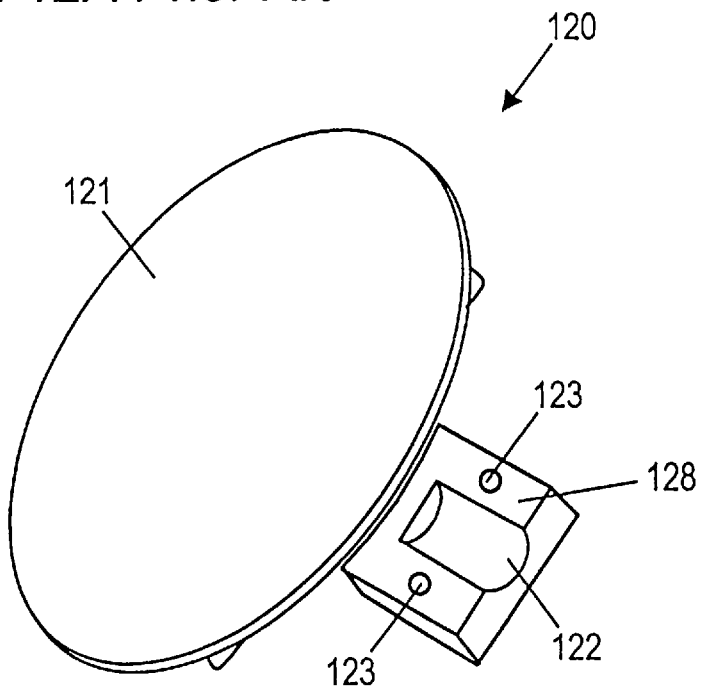
FIG. 12A shows a perspective view of a conventional optical mirror, seen from the front surface of the mirror.

FIG. 1 shows a perspective view seen from the rear side of reflecting surface 11 of optical mirror 10 in accordance with the first preferred embodiment. Reflecting surface 11 of optical mirror 10 has the same construction as conventional optical mirror 120 shown in FIG. 12A. Optical mirror 10 according to the embodiment, as shown in FIG. 1, comprises reflecting surface 11 and holder 18 to which a motor shaft (not shown) is attached. Holder 18 further comprises semi-circular groove 12 for the motor shaft, and screw holes 13.

Reflecting surface 11, as shown in FIG. 1, has on its rear surface:

(1) mirror support beam 14 extending from holder 18;
(2) plural strengthening ribs 15 extending from the both sides of beam 14 toward the rim of the rear surface of reflecting surface 11; and
(3) peripheral ribs 16 that are disposed close to holder 18 and extended along the rim of mirror 10. In addition, slits 17 are formed between mirror support beam 14 and ribs 16 disposed near the holder.

Referring to the accompanying drawings, now will be described such structured mirror 10 of the embodiment.

To attach optical mirror 10 to the motor shaft, the motor shaft is fitted in semicircular groove 12 and held with a retaining ring (not shown) having also a semi-circular groove, then secured by screws at screw holes 13. Diameters both of groove 12 and the groove of the retaining ring are generally sized to be a few micrometers bigger than that of the motor shaft. However, the perimeter of the motor shaft measures bigger than the perimeter of roughly semi-cylindrical shape formed from facing each semi-circular portion of groove 12 and the retaining ring's groove. Therefore, fastening the screws to secure the optical mirror to the motor shaft inconveniently applies a stress to screw holes 13 vertically with reflecting surface 11.

Optical mirror 120 is required to keep enough rigidity against a distortion occurred between reflecting surface 11 and holder 18 while the motor is rotating. For keeping enough rigidity, mirror support beam 14, plural ribs 15, and peripheral ribs 16 close to holder 18 are formed on the rear surface of reflecting surface 11. In addition, reflecting surface 11 and holder 18 are formed in one piece.

Mirror support beam 14 functions as an absorber of the vibrations created in the axial direction of the motor shaft while the motor is rotating. Besides, ribs 15 and 16 make a large contribute to minimize the fluttering of the mirror when rotating.

Figure 2:
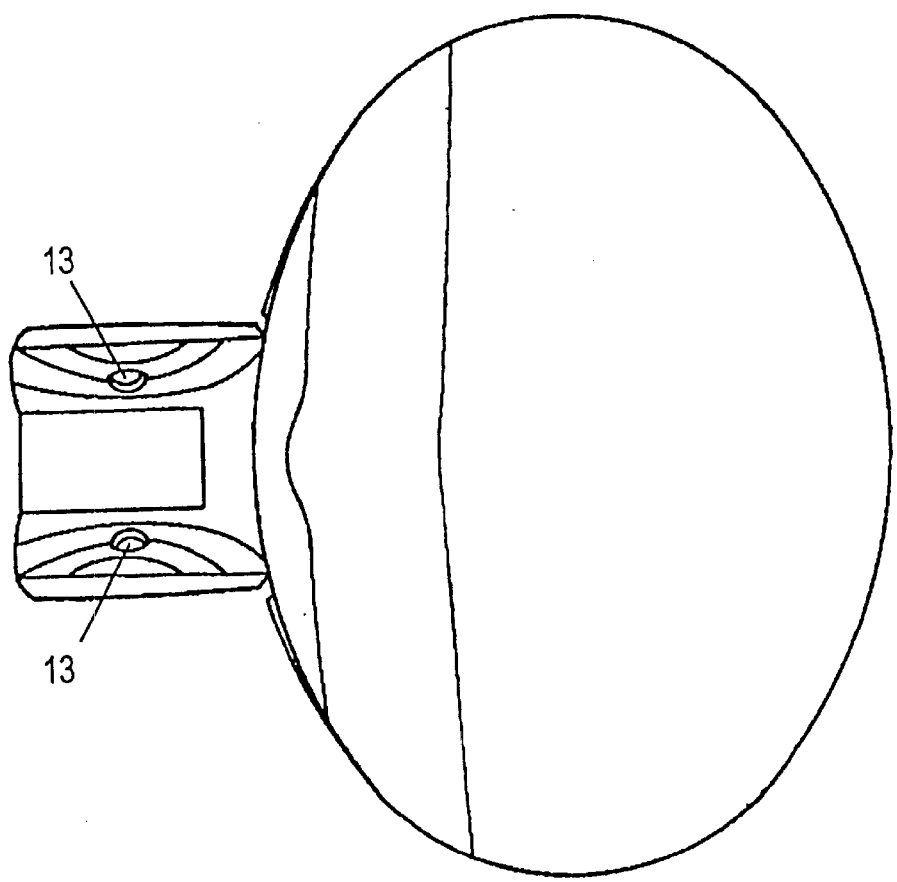
FIG. 2 illustrates a distortion occurred in the mirror shown in FIG. 1.
Figure 12B:
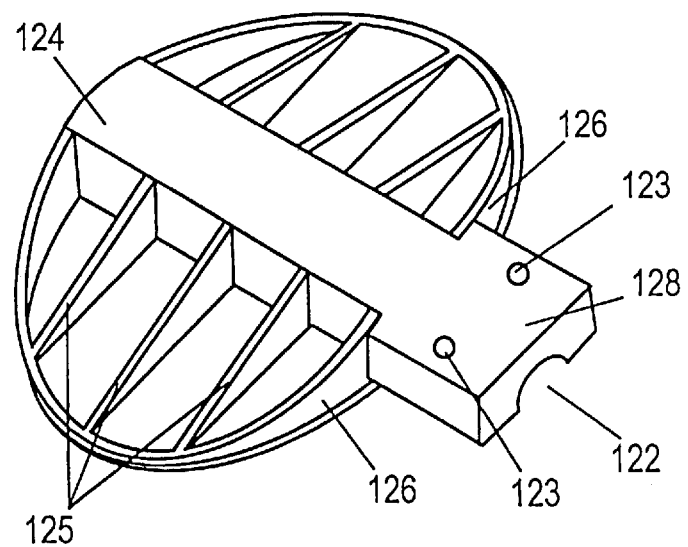
FIG. 12B shows a perspective view of the conventional optical mirror shown in FIG. 12A, seen from the rear surface of the mirror.
Figure 13:
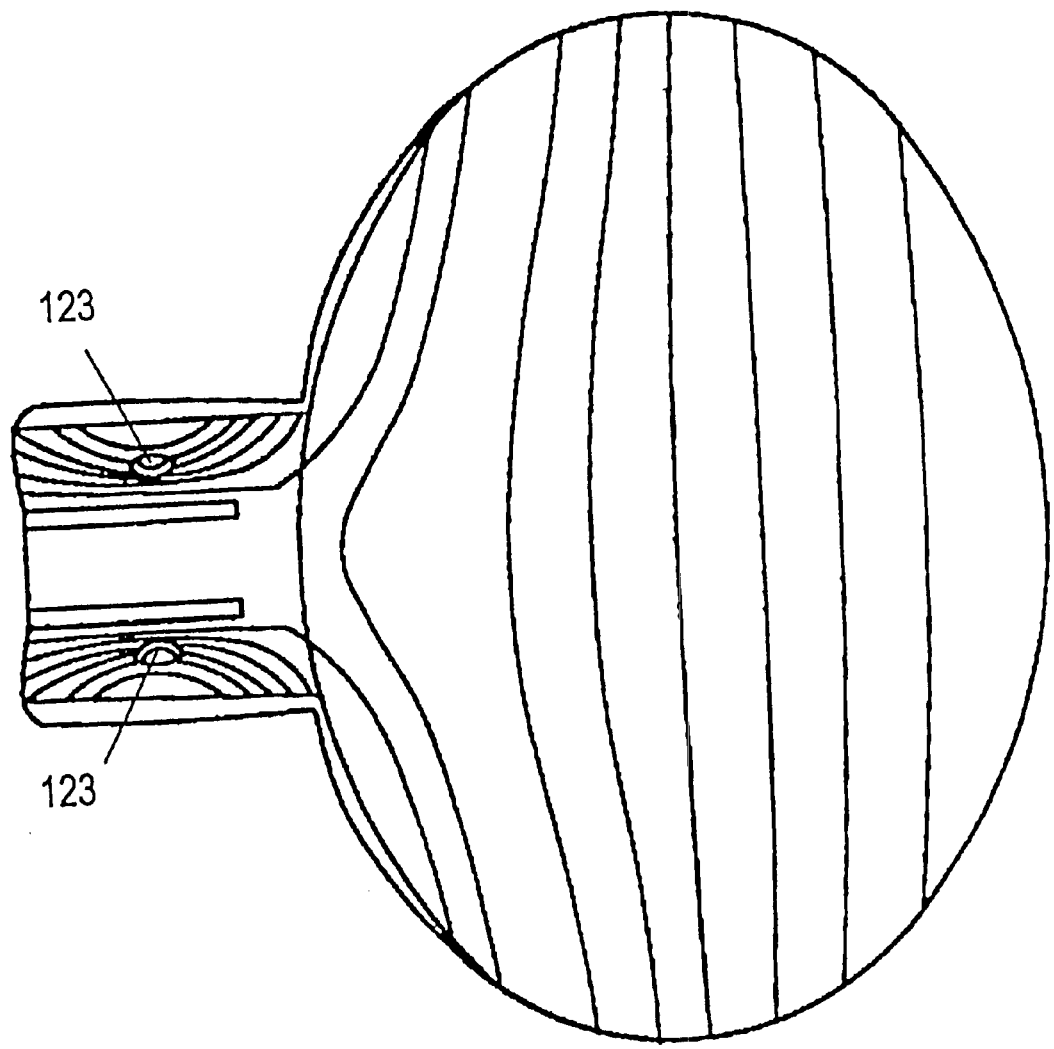
FIG. 13 illustrates a distortion occurred in the conventional mirror shown in FIGS. 12A and 12B when the motor shaft is attached to the mirror and secured with screws.

FIG. 2 shows a distortion occurred in reflecting surface 11 when the optical mirror of the embodiment is attached to the motor shaft. In the FIG. 2, the curves show the distortion based on the measurement results. Slits 17 formed in ribs 16 cut off a distortion that is occurred at screw holes 13 disposed on the both sides of semi-circular groove 12. That is, slits 17 can minimize the propagation of the distortion to ribs 16 disposed along the rim of the rear surface of reflecting surface 11. As a result, reflecting surface 11 has less distortion in the proximity to holder 18 than the conventional optical mirror shown in FIGS. 12A and 12B. Slits 17 formed in ribs 16 can minimize the stress from fastening screws to carry to reflecting surface 11 and thereby reduce the distortion in surface 11.

Figure 3:
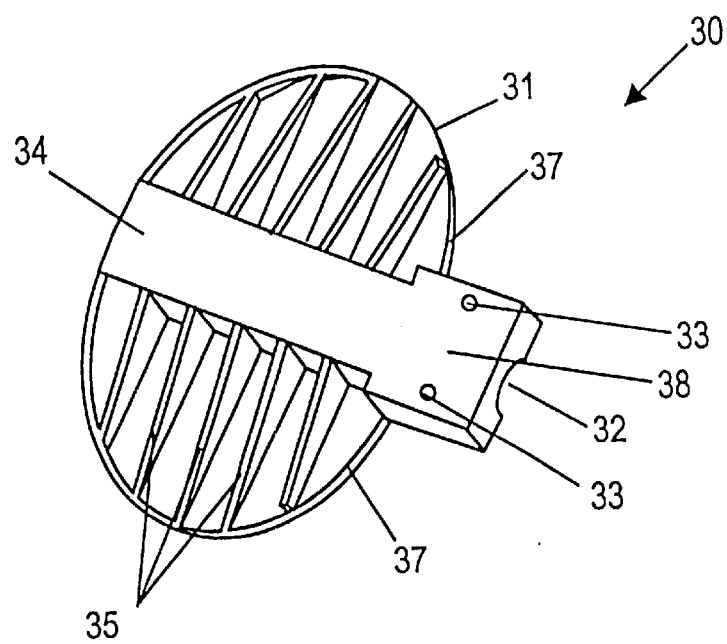
FIG. 3 shows a perspective view seen from the rear surface of another optical mirror in accordance with the first preferred embodiment.

FIG. 3 shows another structure according to the embodiment, seen from the rear side of reflecting surface 31 of optical mirror 30. Reflecting surface 31 of optical mirror 30 has the same construction as conventional optical mirror 120 shown in FIG. 12A. Optical mirror 30 of the embodiment, as shown in FIG. 3, comprises reflecting surface 31 and holder 38 to which a motor shaft (not shown) is attached. Holder 38 further comprises semi-circular groove 32 for the motor shaft, and screw holes 33.

As shown in FIG. 3, reflecting surface 31 has on its rear surface:

(1) mirror support beam 34 extending from holder 38; and
(2) plural strengthening ribs 35 extending from the both sides of beam 34 toward the rim of the rear surface of reflecting surface 31.

Optical mirror 30 shown in FIG. 3 differs from optical mirror 10 shown in FIG. 1 in that ribs 16 are removed from its constitution.

Referring to FIG. 3, now will be described such structured mirror 30 of the embodiment. To attach optical mirror 30 to the motor shaft, the motor shaft is fitted in semicircular groove 32 and held with a retaining ring (not shown) having also a semi-circular groove, then secured by screws at screw holes 33. Diameters both of groove 32 and the groove of the retaining ring are generally sized to be a few micrometers bigger than that of the motor shaft. However, the perimeter of the motor shaft measures bigger than the perimeter of roughly semi-cylindrical shape formed from facing each semi-circular portion of groove 32 and the retaining ring's groove. Therefore, fastening the screws to secure the optical mirror to the motor shaft inconveniently applies a stress to screw holes 33 vertically with reflecting surface 31.

Optical mirror 30 is required to keep enough rigidity against a distortion occurred between reflecting surface 31 and holder 38 while the motor is rotating. For keeping enough rigidity, mirror support beam 34 and a plurality of ribs 35 are formed on the rear surface of reflecting surface 31. In addition, reflecting surface 31 and holder 38 are formed in one piece.

Mirror support beam 34 functions as an absorber of the vibrations created in the axial direction of the motor shaft while the motor is rotating. Besides, ribs 35 make a large contribute to minimize the fluttering of the mirror when rotating.

Figure 4:
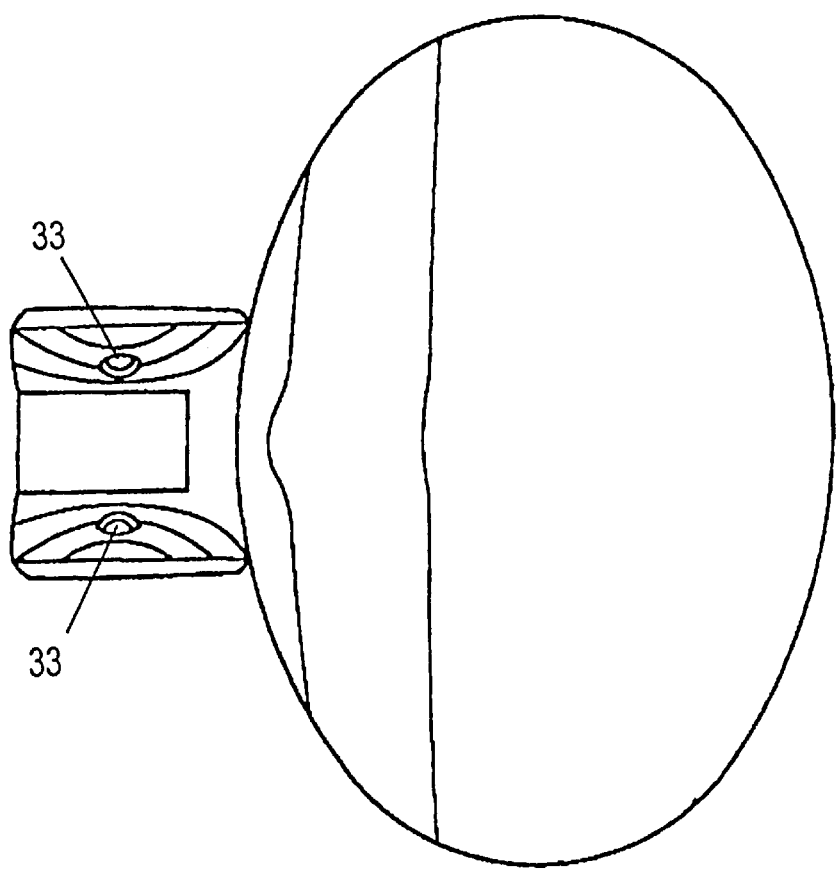
FIG. 4 illustrates a distortion occurred in the mirror shown in FIG. 3.

FIG. 4 shows a distortion occurred in the reflecting surface of the optical mirror shown in FIG. 3. In the FIG. 4, the curves show the distortion based on the measurement results. As shown in FIG. 4, the distortion occurred at screw holes 33, which are disposed on the both sides of semi-circular groove 32, is cut off its propagation to reflecting surface 31. As a result, optical mirror 30 has less distortion in the proximity to holder 38 than the conventional optical mirror shown in FIGS. 12A and 12B. That is, optical mirror 30 shown in FIG. 1 can minimize the stress from fastening screws to carry to reflecting surface 31 and thereby reduce the distortion in surface 31.

Figure 5:
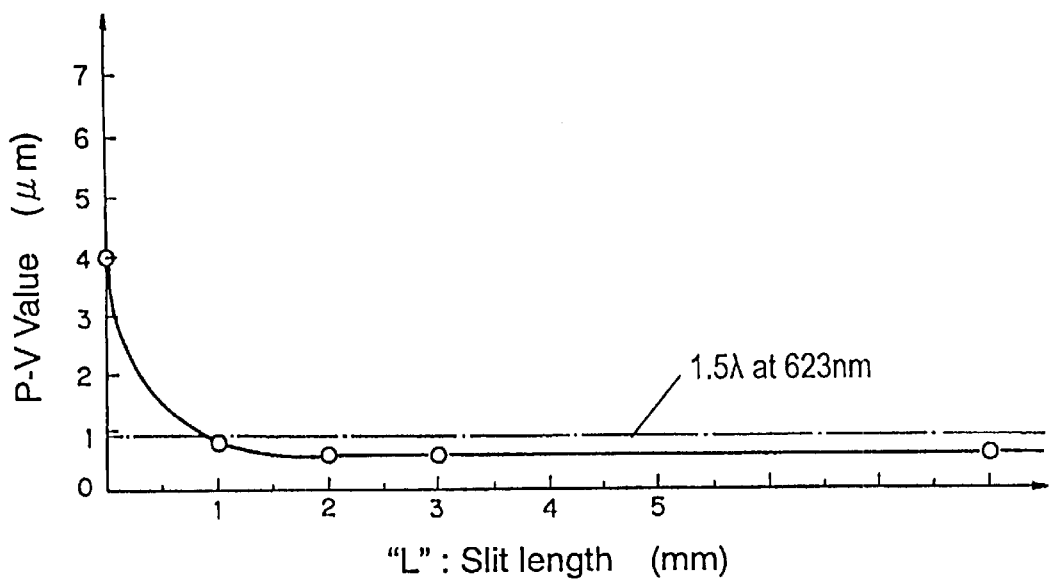
FIG. 5 shows the relation between the distortion in the mirror surface and slit length "L" in the ribs disposed near the holder in accordance with the first preferred embodiment.

FIG. 5 shows the relation between the distortion in the mirror surface and slit length "L" in the ribs disposed near the holder. The distortion in the reflecting surface shown in FIG. 5 is measured, with the motor shaft attached to the optical mirror. The optical mirror made of a material containing beryllium is employed for the measurement. Generally, in terms of the required precision for the surface of the optical mirror described above, the acceptable distortion is at most 900 nm. It is equivalent to the optical path difference of at most one and a half wavelengths, when the light having its beam diameter greater than 25 mm is reflected and measured by an interferometer employing helium neon laser.

As shown in FIG. 5, if at least-1 mm slit (whose length is indicated by "L") is formed in the rib disposed close to the holder, the amount of distortion in the surface can be suppressed within the acceptable value, i.e. at most 900 nm. As shown in FIG. 5, the slit whose length "L" is greater than 2 mm have no additional advantage to the P-V value for the surface precision of the reflecting surface.

Therefore, forming slits 17 (FIG. 1) in ribs 16 near the holder is a crucial determinant in terms of minimizing the distortion caused by fastening screws to carry on the reflecting surface.

The reflecting surfaces in FIGS. 1 and 3 are both shown in roughly circular.

Figure 6:
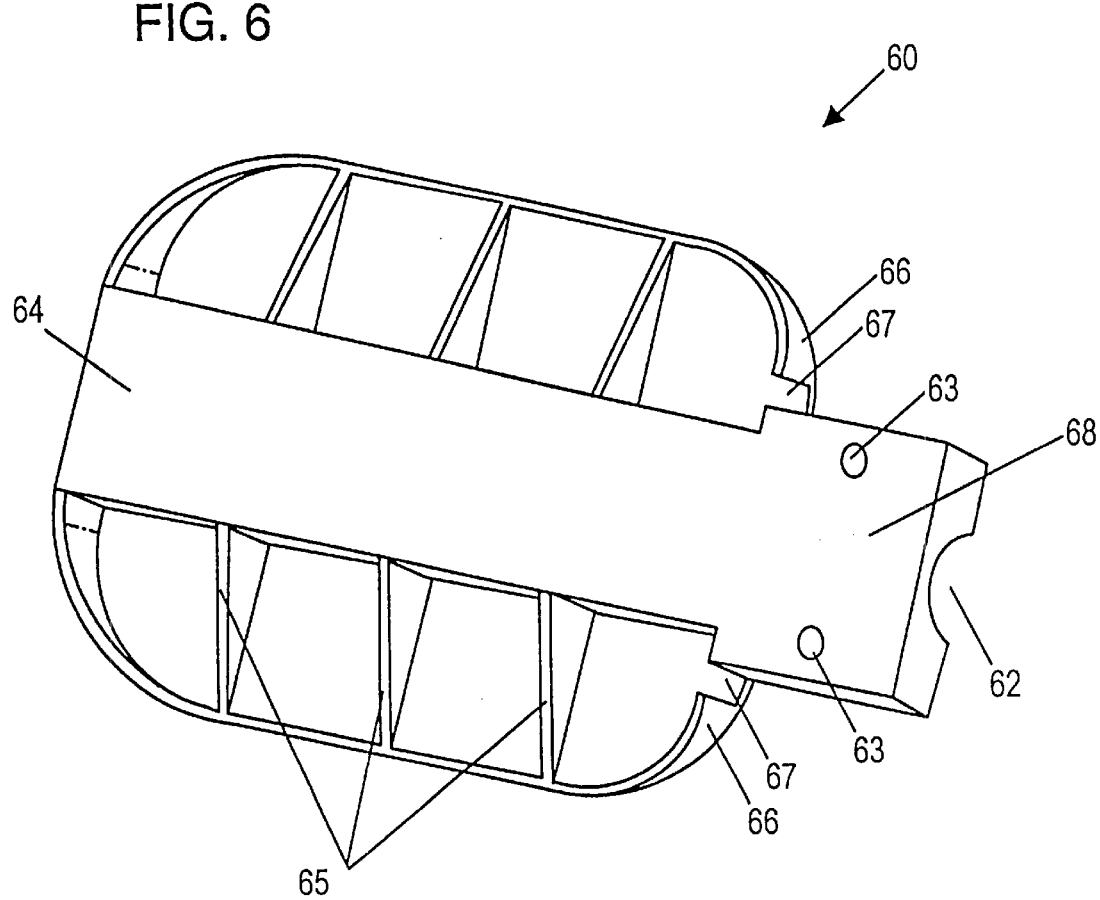
FIG. 6 shows a perspective view seen from the rear surface of roughly rectangular optical mirror in accordance with the first preferred embodiment.

FIG. 6 shows a perspective view of another optical mirror of the embodiment, seen from the rear surface of the roughly rectangular mirror. The reflecting surface, as shown in FIG. 6, has a roughly rectangular shape.

Reflecting surface 61 has on its rear surface:
(1) mirror support beam 64 extending from holder 68;
(2) plural strengthening ribs 65 extending from the both sides of beam 64 toward the rim of the rear surface of reflecting surface 61;
(3) peripheral ribs 66 that are disposed close to holder 68 and extended along the rim of mirror 60. In addition, slits 67 are formed between mirror support beam 64 and ribs 66 disposed close to the holder.

Like the mirror shown in FIG. 1, the optical mirror shown in FIG. 6 is also effective. Also like the structure shown in FIG. 3, ribs 66 disposed close to the holder may be removed from the constitution.

Second Preferred Embodiment

The optical mirror according to the second embodiment of the present invention will be explained with reference to the accompanying drawings.

Figure 7:
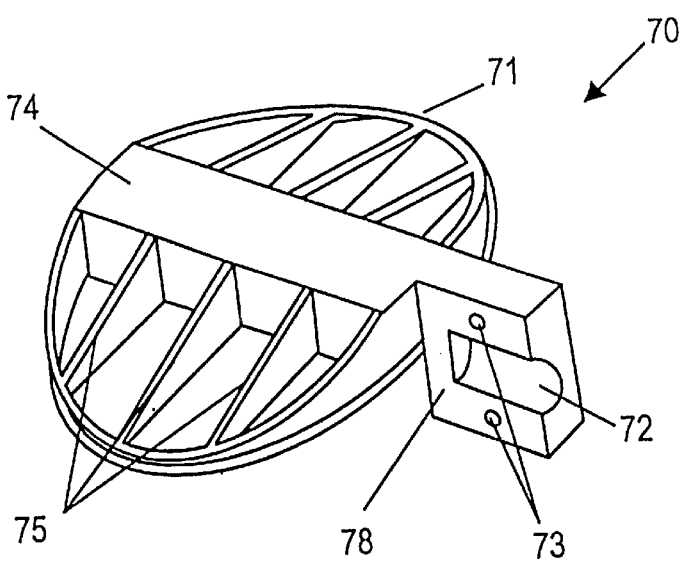
FIG. 7 shows a perspective view seen from the rear surface of the optical mirror in accordance with a second preferred embodiment.

FIG. 7 shows the structure of optical mirror 70 seen from the rear side of reflecting surface 71. Reflecting surface 71 of optical mirror 70 has the same construction as conventional optical mirror 120 shown in FIG. 12A. Optical mirror 70 according to the embodiment, as shown in FIG. 7, comprises reflecting surface 71 and holder 78 to which a motor shaft (not shown) is attached. Holder 78 further comprises semi-circular groove 72 for the motor shaft, and screw holes 73. Besides, the surface with semi-circular groove 72 that is attached to the motor shaft is formed so as to hold in a nearly vertical position relative to reflecting surface 71.

Reflecting surface 71, as shown in FIG. 7, has on its rear surface:
(1) mirror support beam 74 extending from holder 78;
(2) plural strengthening ribs 75 extending from the both sides of beam 74 toward the rim of the rear surface of reflecting surface 71; and
(3) peripheral ribs 76 that are disposed close to holder 78 and extended along the perimeter of mirror 70.

Referring to the accompanying drawings, now will be described such structured mirror 70 of the embodiment.

To attach optical mirror 70 to the motor shaft, the motor shaft is fitted in semicircular groove 72 and held with a retaining ring (not shown) having also a semi-circular groove, then secured by screws at screw holes 73. Diameters both of groove 72 and the groove of the retaining ring are generally sized to be a few micrometers bigger than that of the motor shaft. However, the perimeter of the motor shaft measures bigger than the perimeter of roughly semi-cylindrical shape formed from facing each semi-circular portion of groove 72 and the retaining ring's groove. Therefore, fastening the screws to secure the optical mirror to the motor shaft inconveniently applies a stress to screw holes 73 parallel with reflecting surface 71.

Optical mirror 70 is required to keep enough rigidity against a distortion occurred between reflecting surface 71 and holder 78 while the motor is rotating. For keeping enough rigidity, mirror support beam 74 and plural ribs 75 are formed on the rear surface of reflecting surface 71. In addition, reflecting surface 71 and holder 78 are formed in one piece.

Mirror support beam 74 functions as an absorber of the vibrations created in the axial direction of the motor shaft while the motor is rotating. Besides, ribs 75 make a large contribute to minimize the fluttering of the mirror when rotating.

The surface with semi-circular groove 72 that is attached to the motor shaft is formed so as to hold in a nearly vertical position relative to reflecting surface 71. Due to the structure, a stress is generated in a direction parallel to reflecting surface 71 when fastening the screws at screw holes 73.

Figure 8:
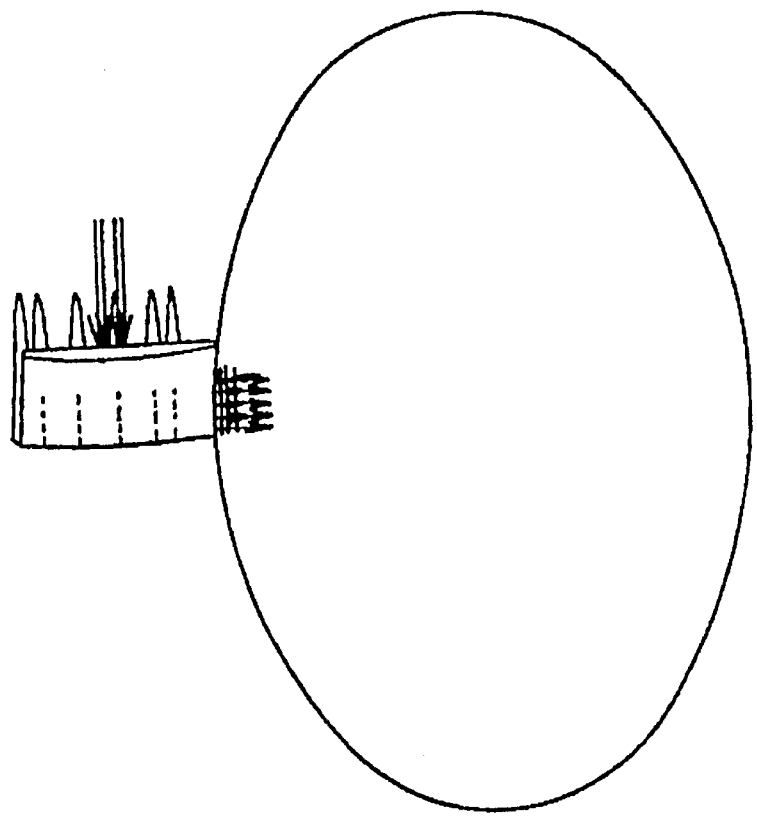
FIG. 8 illustrates a distortion occurred in the optical mirror shown in FIG. 2.

FIG. 8 shows a distortion occurred in the reflecting surface of the optical mirror according to the embodiment. In the FIG. 8, the curves show the distortion based on the measurement results. It is apparent from FIG. 8 that the distortion occurred at screw holes 73 which are disposed on the both sides of semi-circular groove 72 is not carried to reflecting surface 71. That is, such structured optical mirror of the embodiment can minimize or even eliminate the stress generated vertically with reflecting surface 71 and thereby reduce the distortion in surface 71.

Although the reflecting surface of the embodiment is roughly circular shaped, roughly rectangular shaped surface, as shown in FIG. 6, is also effective.

Third Preferred Embodiment

The embodiment relates to a two-dimensional optical scanner equipped with the optical mirror described earlier in the two embodiments. Now will be described the optical scanner with reference to accompanying drawings.

Figure 9:
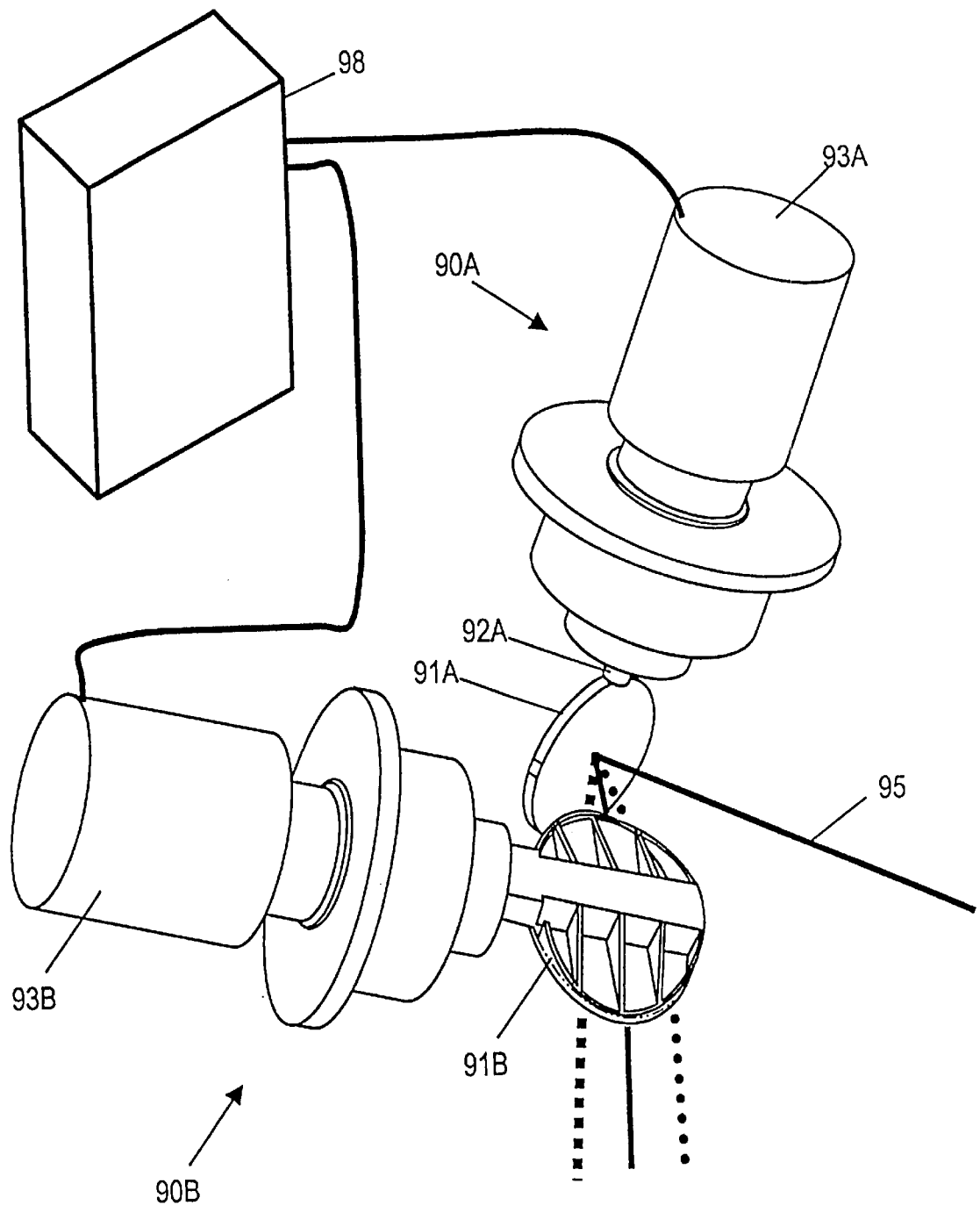
FIG. 9 shows a perspective view of a configured two-dimensional optical scanner.

The two-dimensional optical scanner of the embodiment comprises, as shown in FIG. 9, two sets of galvano-mirrors 90A, 90B and position control unit 98. The optical mirror described in the first or the second preferred embodiment is used for optical mirror 91A and 91B for galvano-mirrors 90A and 90B.

Figure 14:
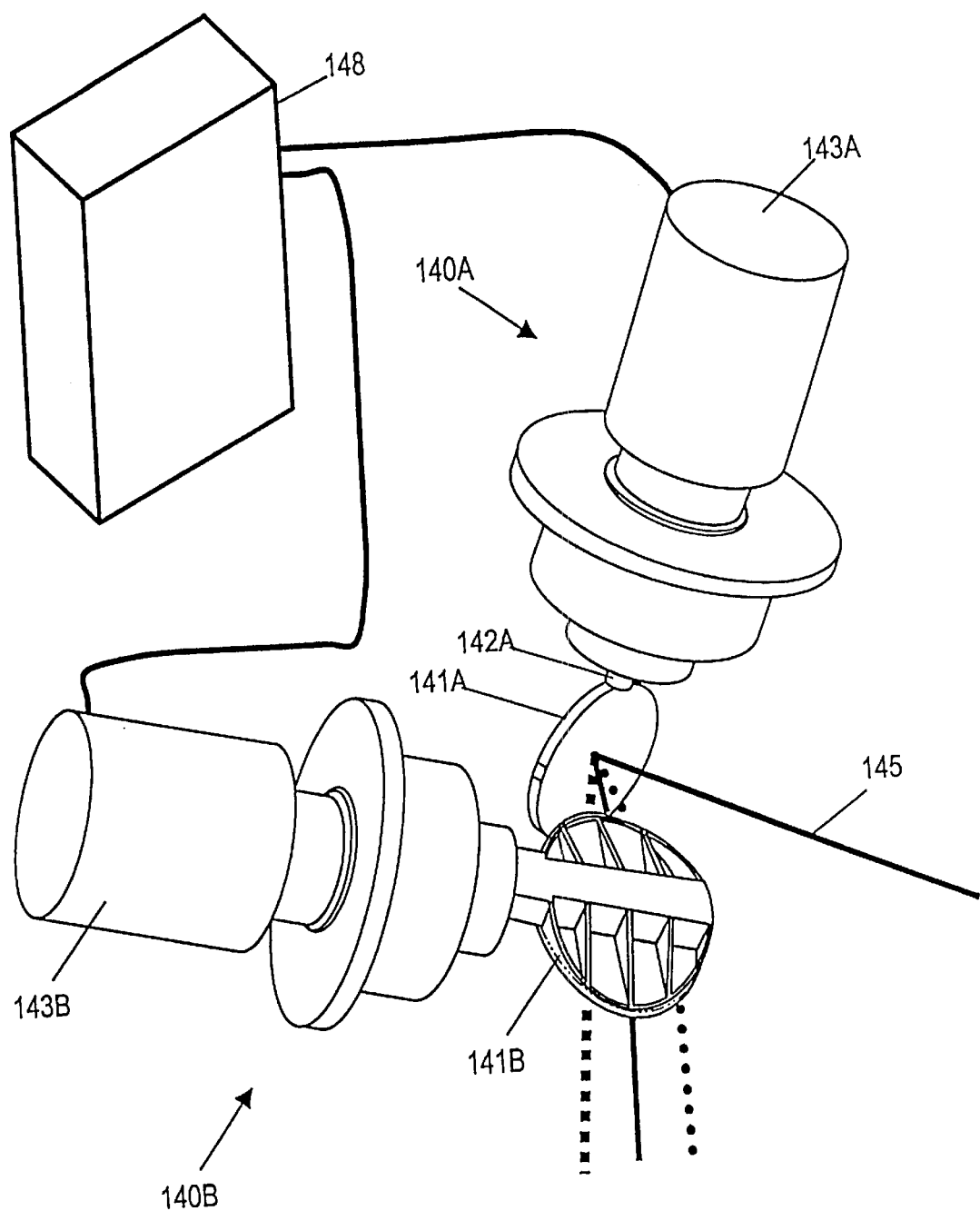
FIG. 14 shows a perspective view of a configured conventional two-dimensional optical scanner.
Figure 15:
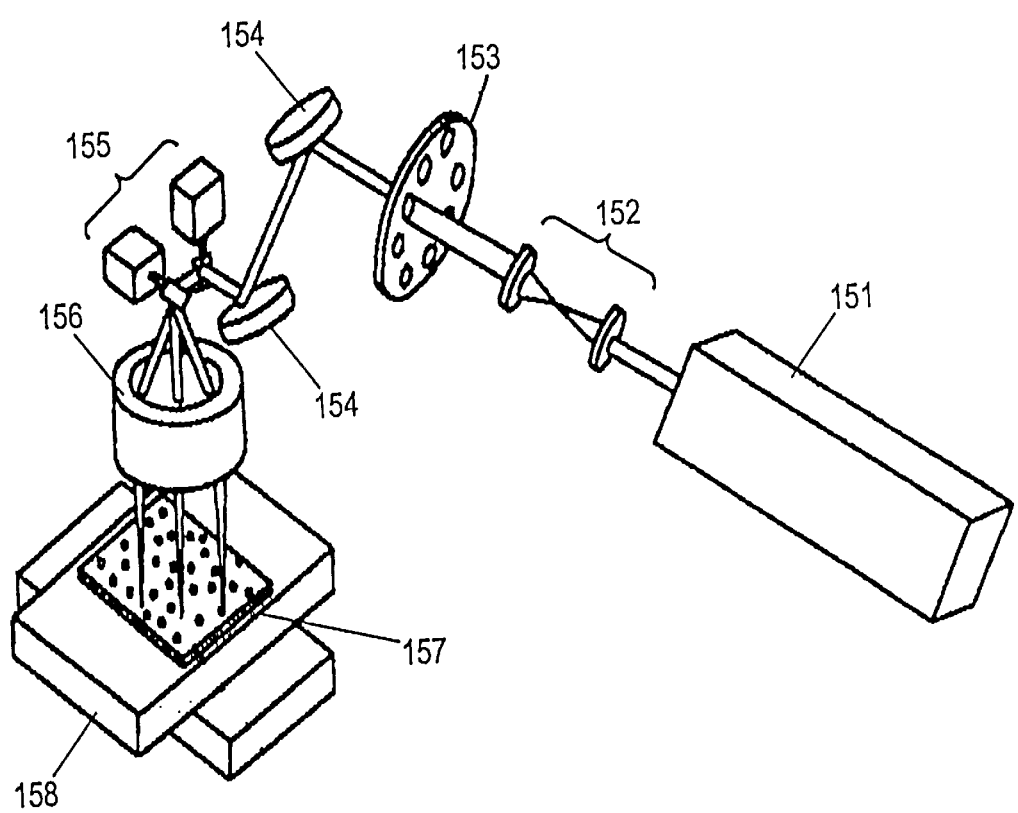
FIG. 15 shows a schematic view of a conventional laser machining apparatus employing the conventional optical scanner.
Figure 16:
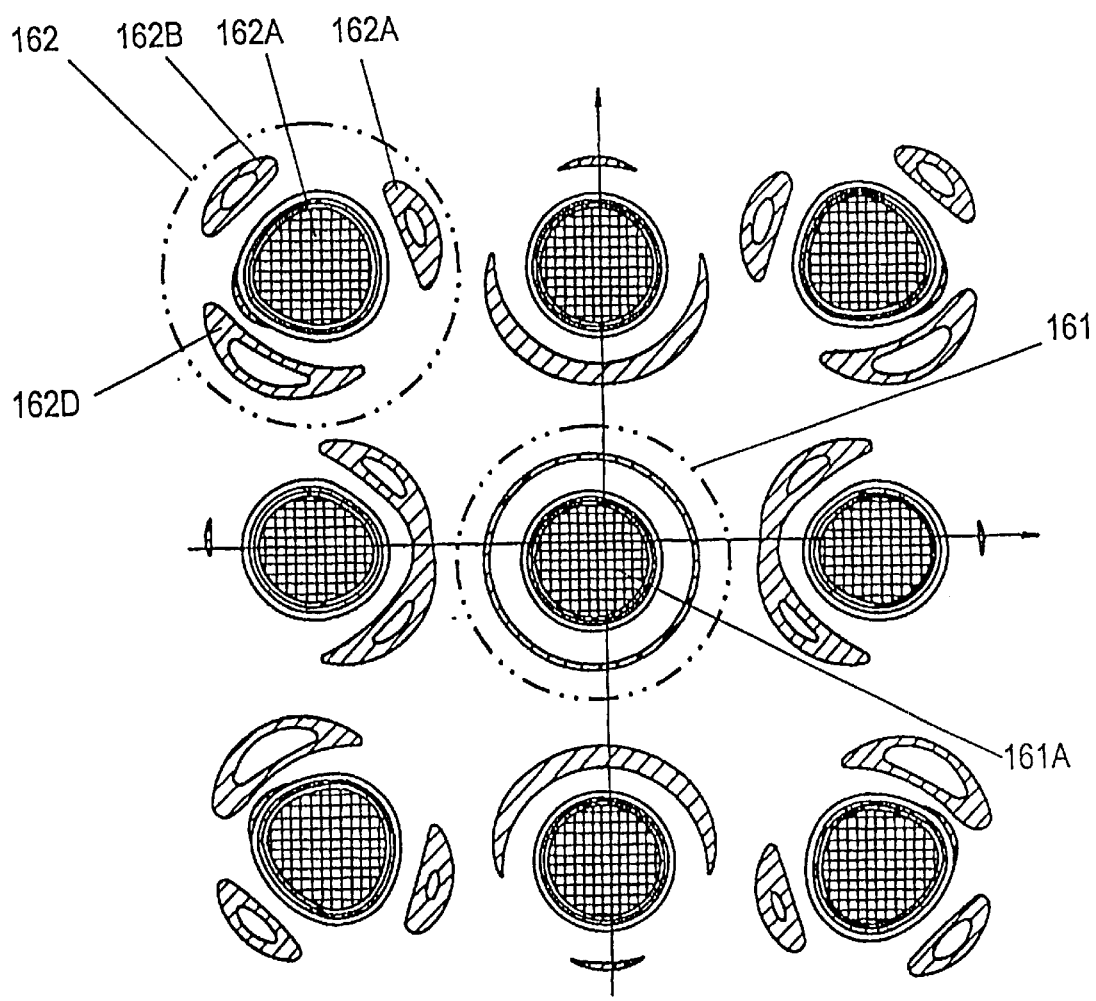
FIG. 16 shows the strength distribution of laser spots in the entire area that the conventional laser machining apparatus can scan, comparing the spots with each other.

As the structure relating to the motor and motor shaft is the same as the conventional type shown in FIG. 14, the explanation will be omitted.

Optical mirror 91A of galvano-mirror 90A, as shown in FIG. 9, rapidly rotates about motor shaft 92A in a horizontal direction, while mirror 91B of mirror 90B rapidly rotates about motor shaft 92B (not shown) in a vertical direction.

The optical scanner structured above operates in a manner, which will be described hereinafter. Optical mirror 91A reflects laser beam 95 shown in FIG. 9 to direct an intended position on optical mirror 91B. In response to the reflection, the position sensor, which is built in motor 93A of galvano-mirror 90A, detects the orientation of mirror 91A. Getting the signal back from the position sensor, position control unit 98 adjusts the reflecting direction.

Similarly, in response to the light incident on mirror 90B, the position sensor, which is built in motor 93B, detects the orientation of mirror 91B. Getting the signal back from the position sensor, position control unit 98 adjusts the reflecting direction. In this way, the two-dimensional scanner of the embodiment enables to properly guide light 95 incident from a fixed direction onto a desired point on the surface.

The scanner of the embodiment employs optical mirrors 91A and 91B, that are described earlier in the first or the second preferred embodiment. Laser beam is reflected by mirrors 91A and 91B then irradiated properly, with very little distortion, on an intended surface.

Although the reflecting surface of the optical mirror of the embodiment is roughly circular shaped, it is possible to employ a roughly rectangular shaped surface for the optical mirror, as shown in FIG. 6, for the same effect. Combination of these different shaped mirrors is also available: one optical mirror may have a roughly circular mirror, while the other may have a roughly rectangular one.

Fourth Preferred Embodiment

The embodiment relates to a laser machining apparatus equipped with the two-dimensional optical scanner described in the third embodiment.

Figure 10:
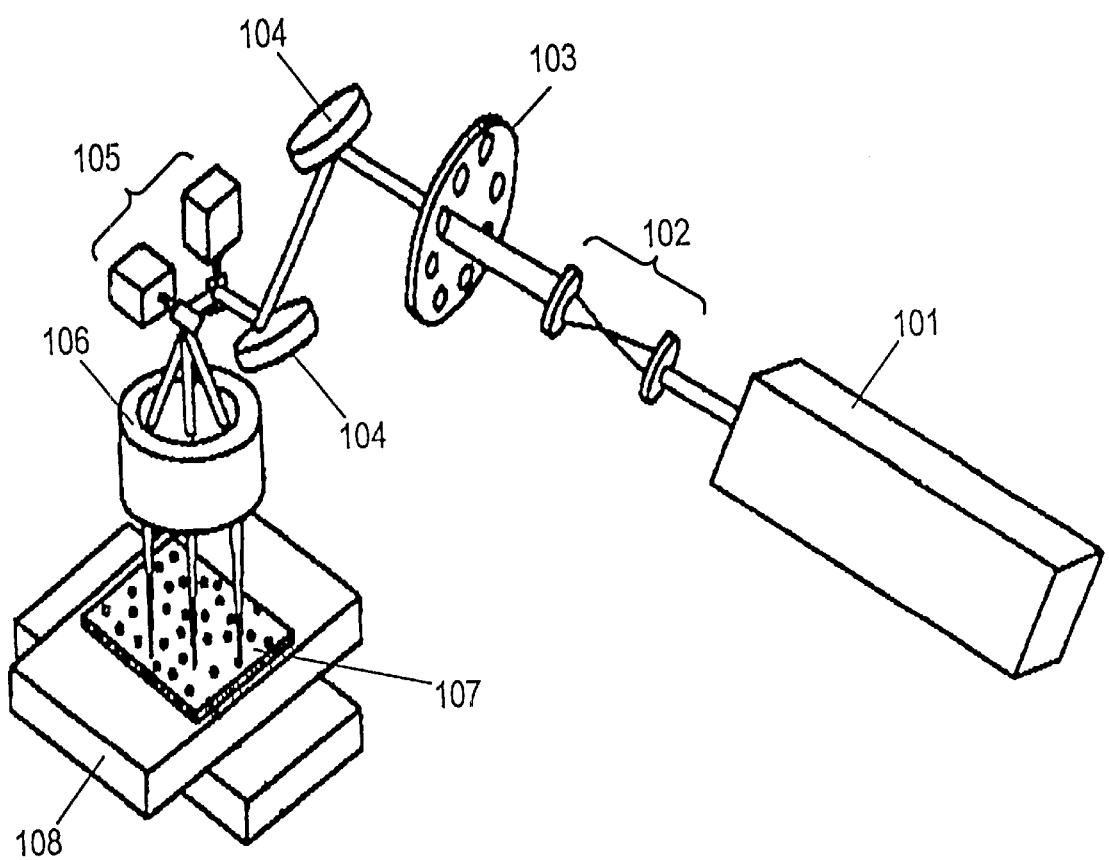
FIG. 10 shows a schematic view of a laser machining apparatus employing the optical scanner.

FIG. 10 shows an optical system of the laser machining apparatus employing the optical scanner shown in FIG. 9. The scanner described in the third preferred embodiment is used for two-dimensional scanner 105 (FIG. 10), which is employed for the laser machining apparatus of the embodiment. Scanner 105 has of course the optical mirror described in the first or the second embodiment. A laser oscillator and the rest of the structure but the optical mirror for scanner 105 are the same as those of the conventional type shown in FIG. 14, so that the description will be omitted.

The laser machining apparatus structured above operates in a manner, which will be described hereinafter. Laser oscillator 101 produces a laser beam. After changing the beam diameter by Collimator 102, the laser beam is irradiated to the mask placed on mask changer 103. A portion of the laser beam, which passes through the mask, is launched, via reflecting mirror 104, into optical scanner 105 for controlling the scanning direction. Then scanning lens 106 projects the shape of the mask on workpiece 107 sitting on the two-dimensional machining table. Workpiece 107 is machined according to the projected mask shape.

Figure 11:
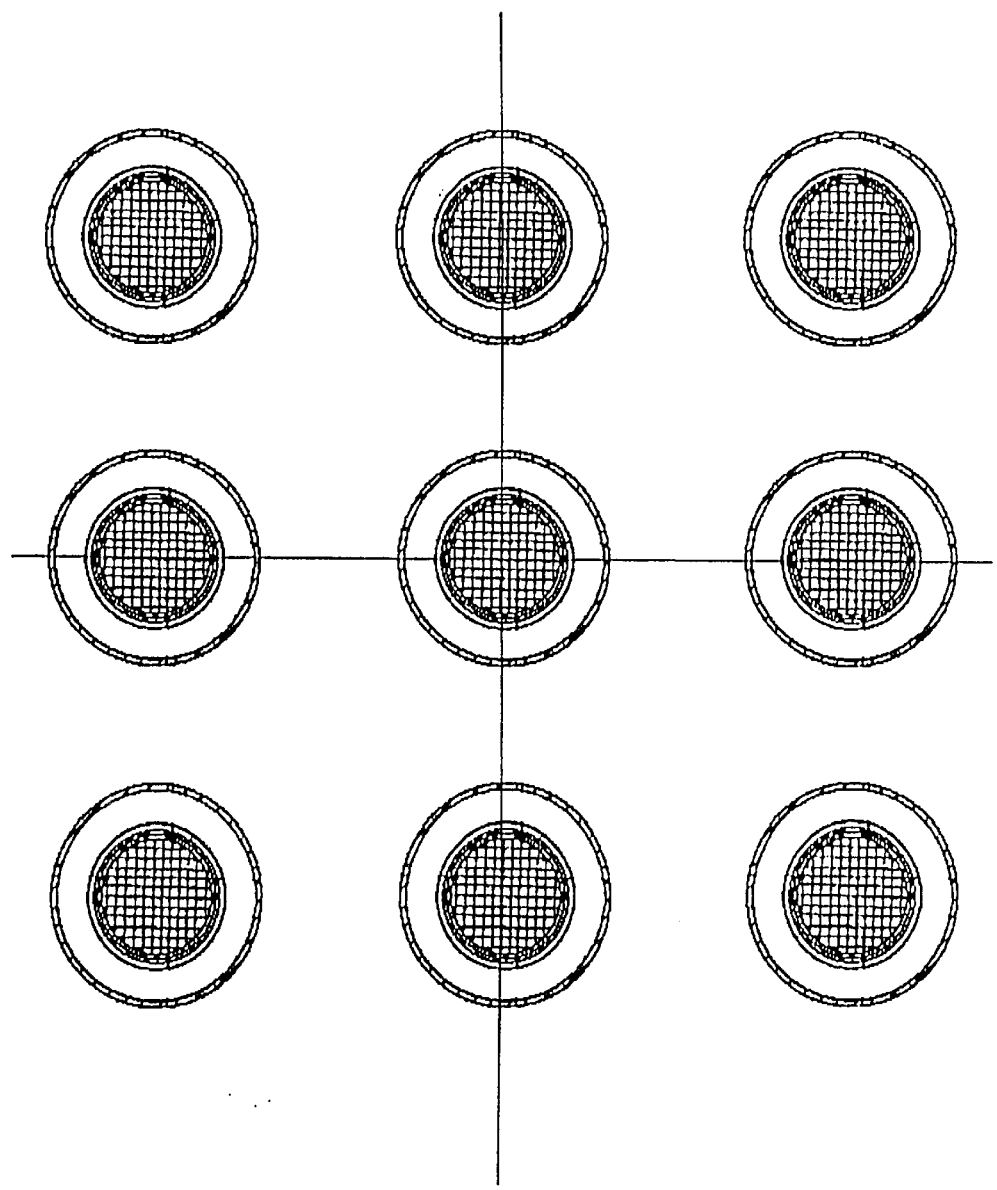
FIG. 11 shows the strength distribution of laser spots in the entire area that the laser machining apparatus shown in FIG. 10 can scan, comparing the spots with each other.

FIG. 11 shows the strength distribution of laser spots, comparing with each other the strength at nine spots in the entire scan area. At all the spots in the center and the periphery, as shown in FIG. 11, each main beam for machining maintains its diameter's shape being circular, i.e. symmetric. In machining a workpiece made of resin with relatively low work threshold, each main beam can evenly machines each hole with its diameter's shape being circular, or symmetric. Unlike the machining with the conventional apparatus, machined workpieces have no flaws such as unwanted holes near the main machined hole.

Although the reflecting surface of the optical mirror for the laser machining apparatus of the embodiment is roughly circular shaped, it is possible to employ a roughly rectangular shaped surface for the optical mirror, as shown in FIG. 6, for the same effect. As shown in FIG. 10, combination of these different shaped mirrors is also available: one optical mirror may have a roughly circular mirror, while the other may have a roughly rectangular one.

With respect to the optical mirror according to an embodiment of the present invention, of the strengthening ribs disposed on the rear surface, the ribs close to the holder have slits adjacent to the support beam running across the rear side of the reflecting surface. Besides, in another embodiment, the holder for the optical mirror is structured such that the motor shaft-to-be-attached surface of the holder is arranged almost vertically with respect to the reflecting surface. With such improved structure, the distortion, which is occurred in the reflecting surface due to fastening screws, is local and negligible. In laser machining, the reflecting mirror of the present invention allows the workpiece to be free from flaws outside its main machined hole.

What is claimed is:

1. A rotatable optical mirror attached to a motor shaft, said rotatable optical mirror comprising:

a reflecting surface having a rear surface; and a holder having an attachment surface adapted to receive the motor shaft, wherein said reflecting surface further includes a support beam connected to said holder and centered on and extending across said rear surface, and a plurality of first ribs extending from said support beam, and wherein said holder is connected to said reflecting surface such that said attachment surface is substantially perpendicular with respect to said reflecting surface.

2. The optical scanner as defined in claim 1, wherein said support beam comprises an outer surface, and wherein said holder is connected to said reflecting surface such that said attachment surface is substantially perpendicular with respect to said outer surface of said support beam.

3. An optical scanner including a motor and an optical mirror, said optical mirror comprising:

a reflecting surface having a rear surface; and a holder having an attachment surface adapted to receive a motor shaft of said motor, wherein said reflecting surface further includes a support beam connected to said holder and centered on and extending across said rear surface, and a plurality of first ribs extending from said support beam, and wherein said holder is connected to said reflecting surface such that said attachment surface is substantially perpendicular with respect to said reflecting surface.

4. A laser machining apparatus equipped with a laser oscillator and an optical scanner arranged on an optical path of a laser beam emitted from the laser oscillator, said optical scanner comprising:

a motor having a motor shaft; and an optical mirror comprising a reflecting surface having a rear surface, and a holder having an attachment surface adapted to receive the motor shaft, wherein said reflecting surface further includes a support beam connected to said holder and centered on and extending across said rear surface, and a plurality of first ribs extending from said support beam, and wherein said holder is connected to said reflecting surface such that said attachment surface is substantially perpendicular with respect to said reflecting surface.

* * * * *